United States Patent
Surjaatmadja

(10) Patent No.: US 7,610,959 B2
(45) Date of Patent: Nov. 3, 2009

(54) METHODS AND MATERIALS FOR SUBTERRANEAN FLUID FORMING BARRIERS IN MATERIALS SURROUNDING WELLS

(75) Inventor: Jim B. Surjaatmadja, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/363,361

(22) Filed: Jan. 30, 2009

(65) Prior Publication Data

US 2009/0159267 A1   Jun. 25, 2009

Related U.S. Application Data

(62) Division of application No. 11/489,852, filed on Jul. 20, 2006, now Pat. No. 7,520,327.

(51) Int. Cl.
*E21B 43/26*   (2006.01)
*E21B 33/138*   (2006.01)
*C09K 8/516*   (2006.01)

(52) U.S. Cl. .......... 166/177.4; 166/281; 166/292; 166/295; 405/52; 405/264; 428/402; 428/407

(58) Field of Classification Search .......... None
See application file for complete search history.

(56) References Cited

U.S. PATENT DOCUMENTS

| | | | | |
|---|---|---|---|---|
| 3,181,612 A | * | 5/1965 | West et al. | 166/283 |
| 3,241,613 A | * | 3/1966 | Kern et al. | 166/280.1 |
| 3,302,717 A | * | 2/1967 | West et al. | 166/283 |
| 3,353,601 A | * | 11/1967 | Dollarhide et al. | 166/283 |
| 4,728,642 A | * | 3/1988 | Pawelchak et al. | 514/57 |
| 4,787,780 A | * | 11/1988 | Harriett | 405/270 |
| 5,318,382 A | * | 6/1994 | Cahill | 405/129.4 |
| 5,476,145 A | * | 12/1995 | Sengul et al. | 166/295 |
| 5,503,227 A | * | 4/1996 | Saponja et al. | 166/277 |
| 5,765,642 A | * | 6/1998 | Surjaatmadja | 166/297 |
| 6,109,350 A | * | 8/2000 | Nguyen et al. | 166/281 |
| 6,258,757 B1 | * | 7/2001 | Sweatman et al. | 507/219 |
| 7,026,272 B2 | * | 4/2006 | Reddy et al. | 507/237 |
| 7,520,327 B2 | * | 4/2009 | Surjaatmadja | 166/281 |
| 2003/0181338 A1 | * | 9/2003 | Sweatman et al. | 507/100 |
| 2004/0020662 A1 | * | 2/2004 | Freyer | 166/387 |
| 2004/0180794 A1 | * | 9/2004 | Reddy et al. | 507/200 |
| 2005/0284647 A1 | * | 12/2005 | Stones | 173/170 |
| 2006/0086501 A1 | * | 4/2006 | Creel et al. | 166/281 |
| 2006/0122071 A1 | * | 6/2006 | Reddy et al. | 507/219 |
| 2007/0044963 A1 | * | 3/2007 | MacDougall | 166/278 |

* cited by examiner

*Primary Examiner*—George Suchfield
(74) *Attorney, Agent, or Firm*—Robert A. Kent; Booth Albanesi Schroeder LLC

(57) ABSTRACT

Disclosed is a method and material for forming a fluid barrier in the material surrounding a wellbore. The method involves temporarily opening a fracture extending from the wellbore and then depositing particulates in the fracture which will swell when exposed to the fluid. The particles are deposited in the fracture without causing appreciable swelling thereof and then, after the fracture closes, the particles are allowed to swell when contacted with the fluid to form a fluid barrier.

16 Claims, 6 Drawing Sheets

- Loose particles: Any flow from inside the vug would disrupt and release the particles

Figure 5a

- Swelled particles: Flow can not go through.

Figure 5b

METHODS AND MATERIALS FOR SUBTERRANEAN FLUID FORMING BARRIERS IN MATERIALS SURROUNDING WELLS

CROSS-REFERENCE TO RELATED APPLICATIONS

This is a divisional of U.S. application Ser. No. 11/489,852 filed on Jul. 20, 2006, now U.S. Pat. No. 7,520,327.

STATEMENT REGARDING FEDERALLY SPONSORED RESEARCH OR DEVELOPMENT

None

REFERENCE TO MICROFICHE APPENDIX

Not applicable

TECHNICAL FIELD

The present inventions relate generally to well drilling completion and production operations and more particularly to the formation of barriers in the materials around wellbores to control and reduce the movement of fluids therein.

BACKGROUND OF THE INVENTIONS

In oil reservoirs, the less-dense oil often lies over a layer of water. When production begins, the oil-water interface rises near the well. There are many factors, such as the presence of thief zones or high permeability zones, voids, fractures and water coning which lead to an increase in water production. Similar problems occur with gas production with oil.

Actions by well operators to increase production, such as water flooding, can also lead to undesirable water production. Water flooding can also lead to inconsistent sweeping actions which require increased water injection and production to recover all significant hydrocarbon pockets.

As oil fields in the United States mature, the volumes of produced water requiring disposal have increased significantly. With numerous older and mature oil fields, the growing problem of water production and stricter environmental regulation of water disposal are forcing oil producers to find ways to eliminate water coning/production and conformance control problems. It has been estimated that approximately many billion barrels of water are reinjected just in the United States every year. Any technology that minimizes the amount of water or gas produced in conjunction with the produced oil would have a significant impact on the volume of oil production and on the cost of oil production.

Various attempts have been made to prevent or reduce the volume of water produced during hydrocarbon production. Crosslinked polymer gels and other materials have been strategically injected into the materials surrounding the well. In U.S. Pat. No. 5,503,227, fractures are formed using a hydrojetting tool, and settable cementitous materials or hardenable resinous materials in a liquid form are squeezed into the fracture to form a block for gas flow around a well. However, difficulties in controlling location and consistency of the placement of these materials in fractures effects performance. Further, these materials tend to be squeezed out of the fracture as the fracture closes. The inability to inject these materials in a large area, or to keep them in the fracture or to keep the fracture horizontal for a long distance, effects the time such procedures remain effective.

Thus, there are needs for methods and materials for use in inhibiting and controlling the movement of fluids in materials surrounding wellbores.

SUMMARY OF THE INVENTIONS

The present inventions provide improved subterranean fluid migration control methods and materials.

More specifically, the present inventions are directed to methods and materials for forming improved fluid migration barriers in the materials around a subterranean wellbore. In another aspect, the present inventions are directed to methods and materials for forming subterranean fluid barriers by forming open fractures extending from the wellbore into the material around the wellbore and, before allowing the fracture to close, inserting materials into the open fracture which form an improved fluid barrier.

In a further aspect, the present inventions are directed to methods and materials for forming subterranean fluid barriers wherein swellable materials (which swell substantially when contacted with the fluid over time) are placed in an open fracture to form a fluid barrier containing material which swells after the fracture closes.

In an additional aspect, the present inventions are directed to methods and materials for forming subterranean fluid barriers wherein swellable elastomeric materials are placed in an open fracture to form a fluid barrier containing material which deforms and swells after the fracture closes.

In an additional aspect, the present inventions are directed to methods and materials for forming subterranean fluid barriers wherein material is placed in an open fracture and wherein the mixture contains swellable elastomeric particles impregnated with swellable materials such as gels, acrylates, clays or the like. Elastomeric particles are made at least in part from materials that have properties that allow them to form elastic seals. Under conditions of confinement, elastomeric particles will, when compressed, mold themselves to exert pressure evenly on the surrounding surfaces, even when the surfaces are rough and the gaps to be filled are of uneven size. The ability of the materials to mold themselves to the rough surfaces insures that it will stay in place due to the high-friction forces with the fracture face. The swelling feature assures a good waterproof seal through the fracture even when closing of the fracture does not create a local high-compression force. Particles made from elastomeric particles have the ability to move fluids by osmosis. When mixed or impregnated with swellable materials, these particles create timed swelling as fluids move by osmosis through the particles. Also, as the swellable material is held in place in the fracture, subsequent swelling will cause it to fill in any void adjacent to it, causing a positive block within the fracture.

In another aspect, the present inventions are directed to methods and materials forming subterranean water barriers wherein slurry mixture containing water-swellable rubber particles impregnated with water-swellable material such as gels, acrylates, clays or the like is pumped into an open pressure-induced fracture and wherein the fracture is allowed to close and, when water contacts the fracture, the swellable material swells to form the fluid barrier.

A more complete understanding of the present inventions and the advantages thereof may be acquired by referring to the following description taken in conjunction with the accompanying drawings in which:

BRIEF DESCRIPTION OF THE DRAWINGS

FIGS. 5*a* and 5*b* illustrate a sectional view of unswelled and swelled particles in a vug, cavern, void or similar opening in a subterranean area.

DETAILED DESCRIPTION

The present inventions provide improved methods and materials for fluid movement control when used in completing a wellbore penetrating a formation. The methods and materials can be used in either vertical, deviated or horizontal wellbores, in consolidated and unconsolidated formations, in "open-hole" and/or under reamed completions as well as in cased wells. If used in a cased wellbore, the casing is perforated to provide for fluid communication with the wellbore. The term "vertical wellbore" is used herein to mean the portion of a wellbore to be completed which is substantially vertical or deviated from vertical in an amount up to about 15°. The term "horizontal wellbore" is used herein to mean the portion of a wellbore to be completed which is substantially horizontal, or at an angle from vertical in the range of from about 75° to about 105°. All other angular positioning relates to a deviated or inclined wellbore. Since the present inventions are applicable in horizontal and inclined wellbores, the terms "upper and lower" and "top and bottom" as used herein are relative terms and are intended to apply to the respective positions within a particular wellbore, while the term "levels" is meant to refer to respective spaced positions along the wellbore.

The present inventions can be used in forming subterranean fluid barriers that extend transversely from a wellbore. For purposes of illustration, the present inventions will be described in the context of a typical water contamination problem in which water is produced with the hydrocarbons. It is to be understood that the methods and materials of the present inventions have application to other situations where blocking the flow of fluids is needed.

Figure 1:
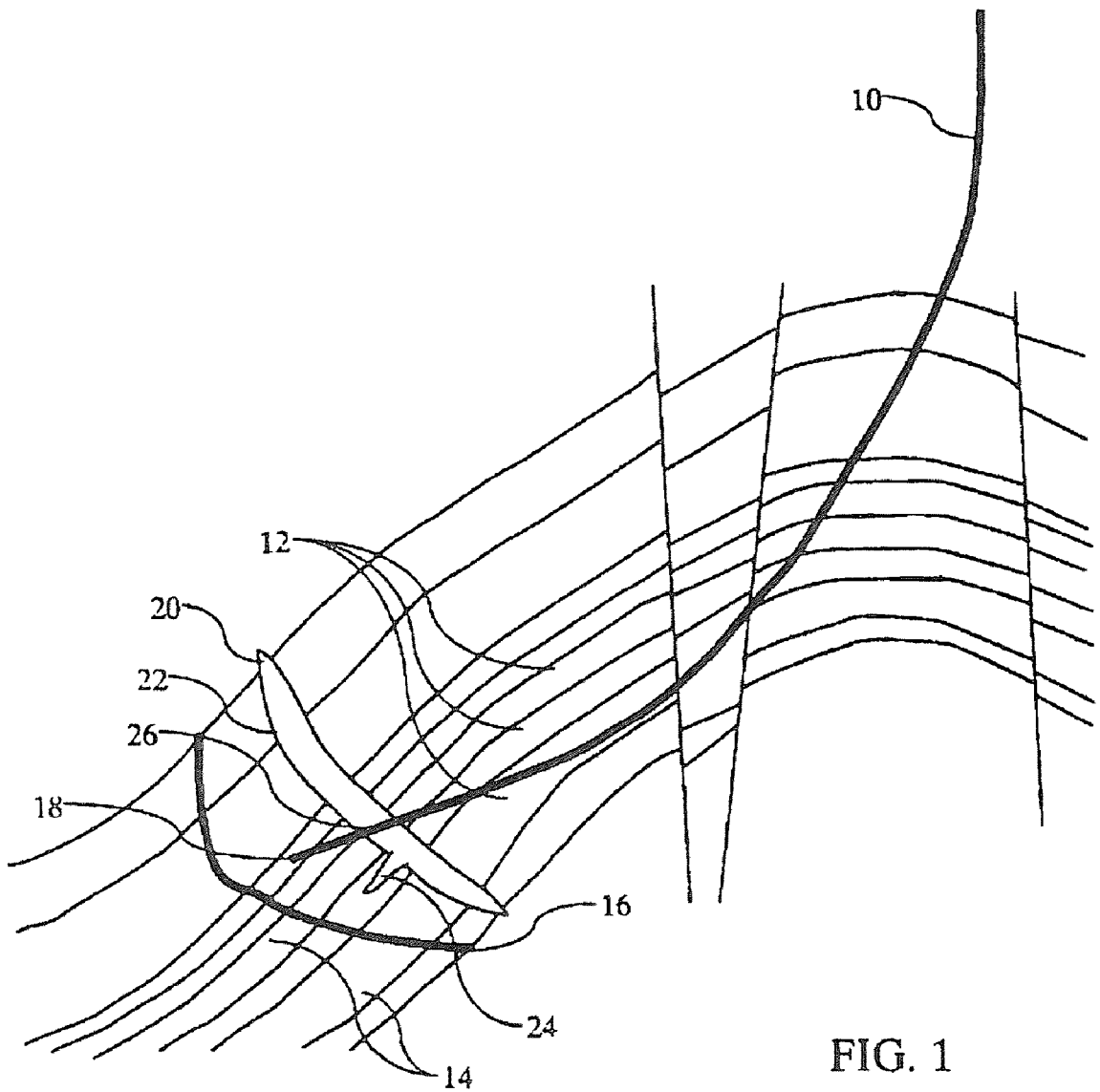
FIG. 1 is a cross section of a well incorporating the improved method of the present invention.

Referring more particularly to the drawing, FIG. 1 illustrates a wellbore 10. The wellbore 10 extends through a hydrocarbon-containing subterranean formation area 12 and into a water-bearing area 14. As is commonly known in the art, there is generally no distinct water-hydrocarbon boundary. The boundary is more like an area composed of a mixture of varying proportions of water and hydrocarbons. For the purpose of description, the water-hydrocarbon boundary area is illustrated as a broad line 16, it being understood, of course, that the water-hydrocarbon boundary area could be much more irregular and larger than the line.

The lower end of the wellbore 18 is illustrated extending to a location just above the boundary 16. Typically, as hydrocarbons are produced (removed) from the area surrounding the well, the water boundary 16 will rise until it is in contact with the lower end of the wellbore 18. Indeed, hydrocarbons can be produced at a rate that will cause the water boundary to extend upward or "cone" around the wellbore, speeding up the production of significant volumes of water with the hydrocarbons According to the present inventions, a fracture 20 is opened up to extend from the wellbore. The fracture 20 in this case is generally disk shaped extending from the wellbore 10 in all directions. As will be described, fracturing technology exists to created open fractures from wellbores extending in selected directions, distances and having selected shapes. In the present embodiment, the fracture is formed to extend from all sides about 500 ft. from the wellbore. In this embodiment, the fracture 20 is filled with a particulate water-swellable elastomeric material 22. The material 22 is pumped into the fracture 20 in a slurry form and also into any flow paths in the form of voids 24 intersecting the fracture 20.

Any known fracture stimulation fluid can be used as the carrier fluid for this slurry. They could be either water based or oil based, and can be formed using gases such as nitrogen or carbon dioxide. An example of water-based fluids include the Halliburton HyBor or DeltaFrac systems, while oil-based fluids include diesel or MyT-Oil fluid systems. In general, fracture generation can be done using any method, however, preferably, the SurgiFrac® method as described in U.S. Pat. No. 5,765,642 can be used. In this latter method, the slurry is pumped through a pipe, through a jetting sub which is positioned (by means of the pipe) such that the jet faces the point 26. Initially, the jetting sub would jet sand-laden fluid at high velocities, so that holes and cavities are created through the casing, cement and the formation rock. After this, a "pad" fluid (which is generally the fracturing fluid without any proppants) is jetted into the formation, causing a fracture to initiate and extend substantially. Point 26 now has become the fracture initiation point, while the jet direction dictates the fracture initiation direction. A typical fracture extension can be of any size, yet, practically, between 50 ft. to above 1000 ft. long. Once the fracture is generated, the fluid containing swellable material is injected through the jets. Note that, should the SurgiFrac® process not be used, placement of the fracture is done conventionally, e.g., perforating using perforating guns at point 26, then placing a packer system (like a straddle packer or a bridge plug below and a packer above point 26) so that the fracture can be generated at that position.

The fracture 20 is allowed to close trapping the material 22. Flow from the portion 18 of the wellbore is blocked above the fracture initiation point 26 by setting a bridge plug, forming a cement plug or the like. The point 26 is preferably located in the wellbore at about the fracture to close off water flow through the wellbore from the water-bearing side of the fracture. As water reaches the fracture 20, it contacts the trapped material 22, whereupon it swells creating a water-blocking structure along the fracture extending from the wellbore. This structure substantially lengthens the path of water to the wellbore, thus inhibiting, if not preventing, water production for substantial periods of time. Alternatively, it is envisioned that particles of hydrocarbon-swellable elastomeric materials could be deposited in the fracture to block the movement of hydrocarbon fluids.

Figure 3:
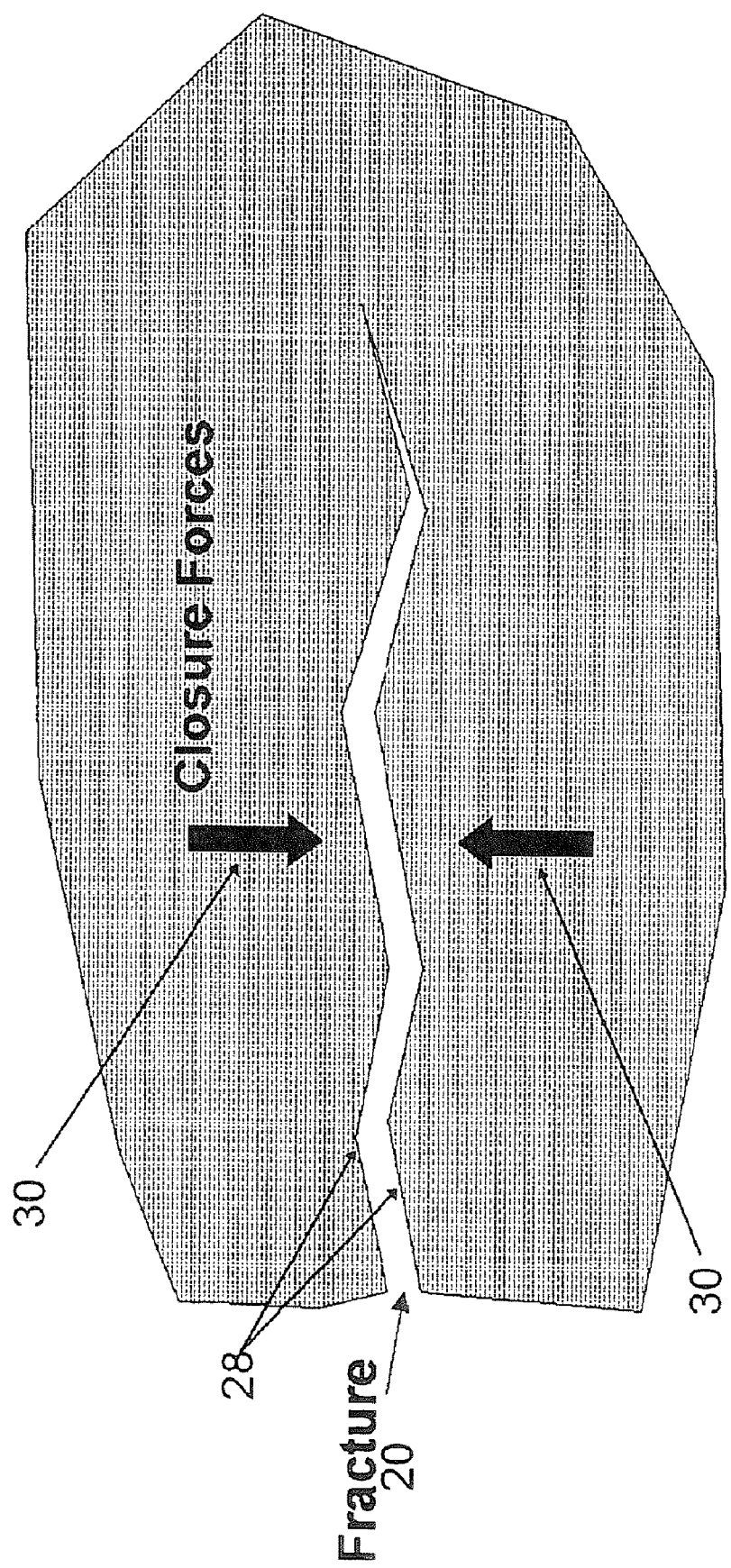
FIG. 3 is a sectional view of an open fracture within a subterranean area; where closure stresses are shown to cause closure of fracture.

FIG. 3 illustrates a "fracture" 20 in an earth formation. In general, a fracture is created either during a well-stimulation process or naturally during a tectonic movement of the earth. A fracture is generally formed as a planar opening, which tends to close again due to formation closure forces (stresses) 30 which are caused by the overburden weight of the soil above the fracture. This is where the concepts discussed in this application differ from approaches using RPM (relative permeability modifiers) or fine powder or cementitious powders: As the fracture starts to close, liquefied materials, such as gels and the like, will be squeezed out of the fracture. However, large particles tend to be held in place at least temporarily by contact with the fracture's faces 28. As the material starts to swell, this "temporary" condition becomes permanent, and even tectonic movements of the earth will not release this material.

Figure 4:
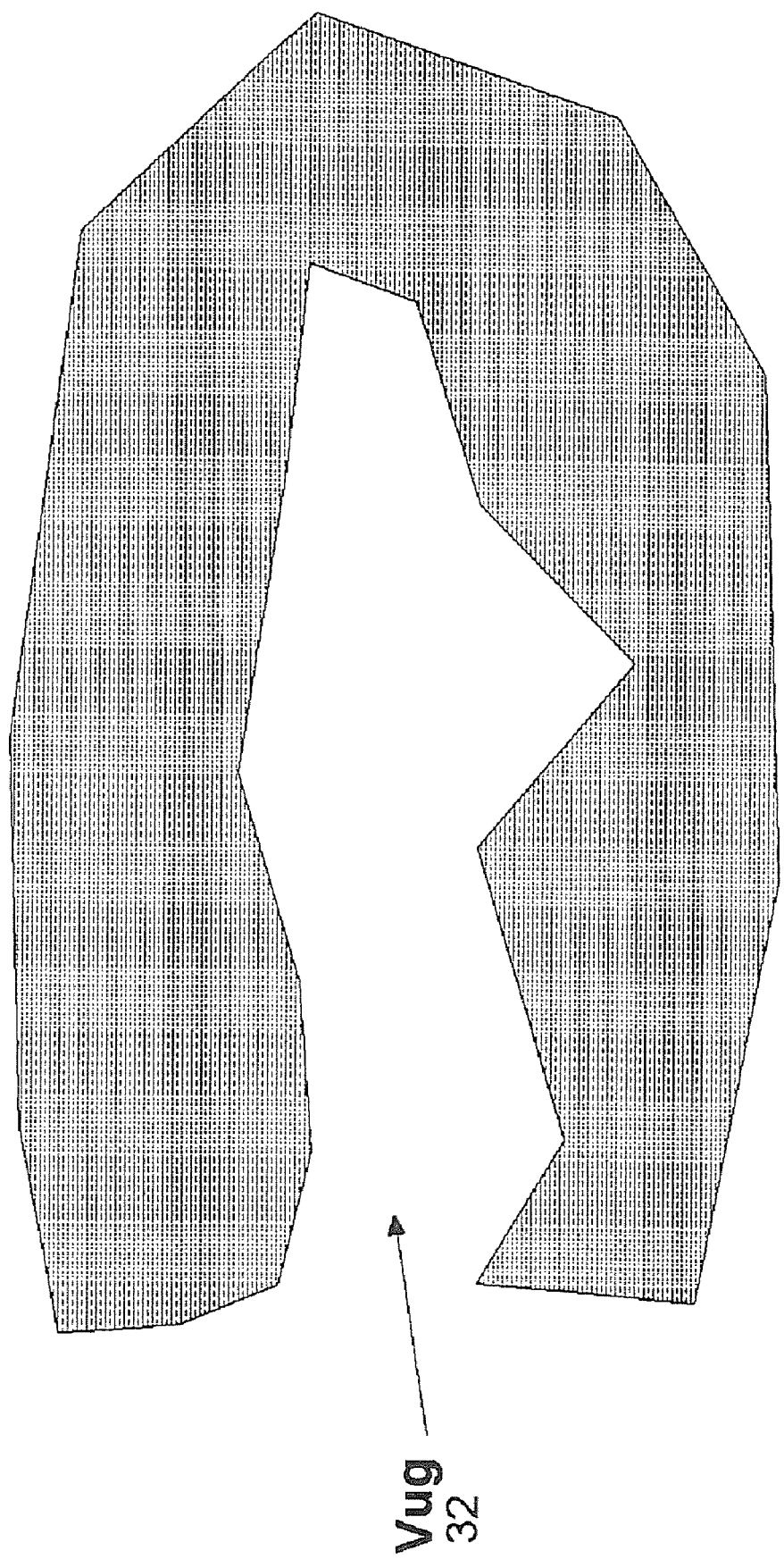
FIG. 4 is a sectional view of a stable vug, cavern, void or similar opening within a subterranean area.

FIG. 4 illustrates a vug 32. A vug is void in the form of a cavity or a large cavern in a formation. Vugs 32 are common and cause unwanted fluids to move in or out the wellbore. A vug is generally stable and will not close unless a tectonic movement creates instability. It is immediately seen that sealing a vug can be a problem using conventional materials.

FIG. 5a illustrates non-swelling material 34 filling a vug 32. When fluid flow back 36 occurs, the particle wall collapses, since nothing is holding the particles back. FIG. 5b illustrates the use of swelling material 22. After swellable material 22 is pumped into the vug 32, it is held in place a period of time sufficient to allow the swellable material 22 to swell into a solid 38, making it impossible to move.

Water-swellable elastomeric particles 22 are made, at least in part, from elastic materials that have properties that allow them to form elastic seals. Elastomeric materials are substances that are capable of returning to their original shape after undergoing stress or deformation. Under conditions of confinement, elastomeric particles will, when compressed, mold themselves to exert pressure evenly on the surrounding surfaces, even when the surrounding surfaces are rough and the gaps to be filled are of uneven size. This property of elastic materials is believed to provide an advantage, in that, when the fracture closes, the elastomeric particles 22 are confined and compressed causing them to mold to fit the fracture. This causes a gripping action to the fracture face 28. The swelling feature, which generally happens a few hours later or even days later, adds an additional advantage, in that the particles 22 swell in volume assuring a good waterproof seal through the fracture even where closing of the fracture does not create a local high-compression force on the particles 22. Thus, the properties of swellable elastomer particles cause the particles, when compressed and expanded in a closed fracture, to fill any open space in the fracture and block fluid flow therethrough.

Figure 6:
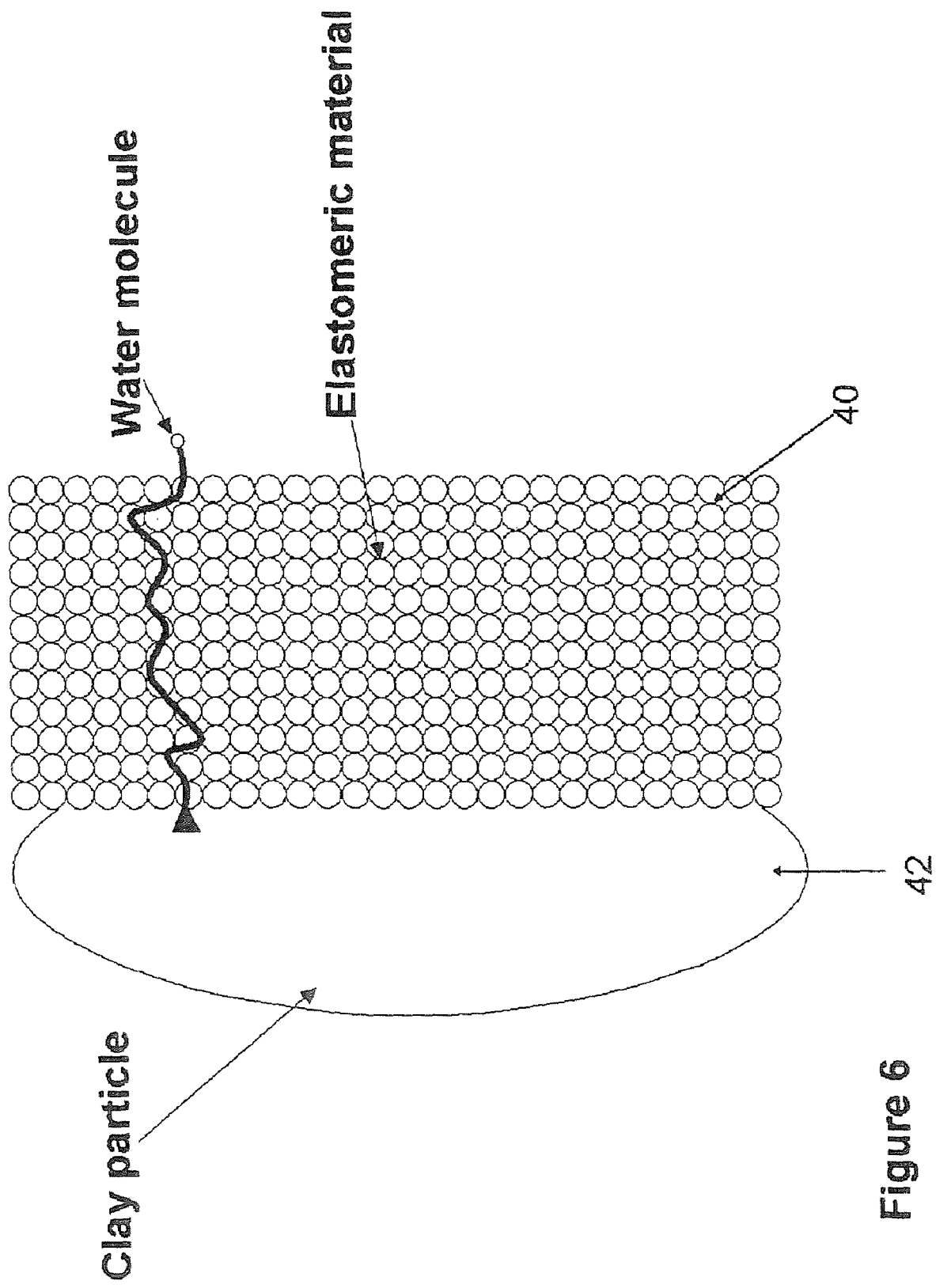
FIG. 6 illustrates the process by which a water molecule moves through an elastomeric material by means of osmosis.

In the preferred embodiment, the swellable material 22 is chosen to react slowly, such as hours or days. For example, some materials can expand or swell immediately. Chemically delaying the reaction may work, but not effectively. In this embodiment, the preferred material is made of SBR (Styrene Butadiene Rubber) impregnated with clays and/or polyacrylates. The SBR, being quite solid, is known to be very porous to many solvents. In fact, SBR, soaked in petroleum products or water, will absorb some fluid which causes SBR to swell. In this embodiment, SBR is used as a membrane: to allow water or solvents to go through the permeable wall and attach to the swellable clay particle. Osmotic action is the mechanism used in this process: water is pushed into the particle by means of osmotic pressure (also called "turgor pressure"). As is illustrated in FIG. 6, the SBR material 40 is mixed with water-swellable clay 42 (such as bentonite). The osmosis process is slow, so the swelling process often takes substantial time, even days, to occur. This is a definite advantage over fast-swelling materials that reach stability before reaching the desired location in the fracture.

In the water-blocking embodiment, water-swellable elastomer particles that are used can be of any size, but, preferably, they should be in the range of 2-100 mesh so that they can be pumped easily. Any natural and synthetic rubbers, which swell upon water exposure, may be employed in the present inventions. Water-swellable rubber can stop water not only by means of elastic sealing but also by means of swelling in water. WSR is a kind of multicomponent blend, composed of rubber, water-absorbent resin and other additives. The rubbers used are often conventional rubbers or their copolymers. The water-absorbent resins are usually starch grafts, cellulose grafts, poly(ethylene oxide) polymers, poly(vinyl alcohol) polymers, etc. Water-swellable elastomeric particles can also be made mechanically or chemically, by impregnating rubbers with water-swellable materials such as gels, acrylates, clays or the like.

WSR materials are available commercially, and one type was available from Ohji Rubber and Chemicals Co., LTD 1-6 Katsuma 2-Chome, Hofu, Yamaguchi 747-0822, Japan. Ohji markets a rubber compound under the name AQUAQUELL. AQUAQUELL is an extruded rubber compound made from CR/SBR rubber, hydrophilic resin and urethane. On contact with water, it is capable of swelling to eight times its own volume.

Figure 2:
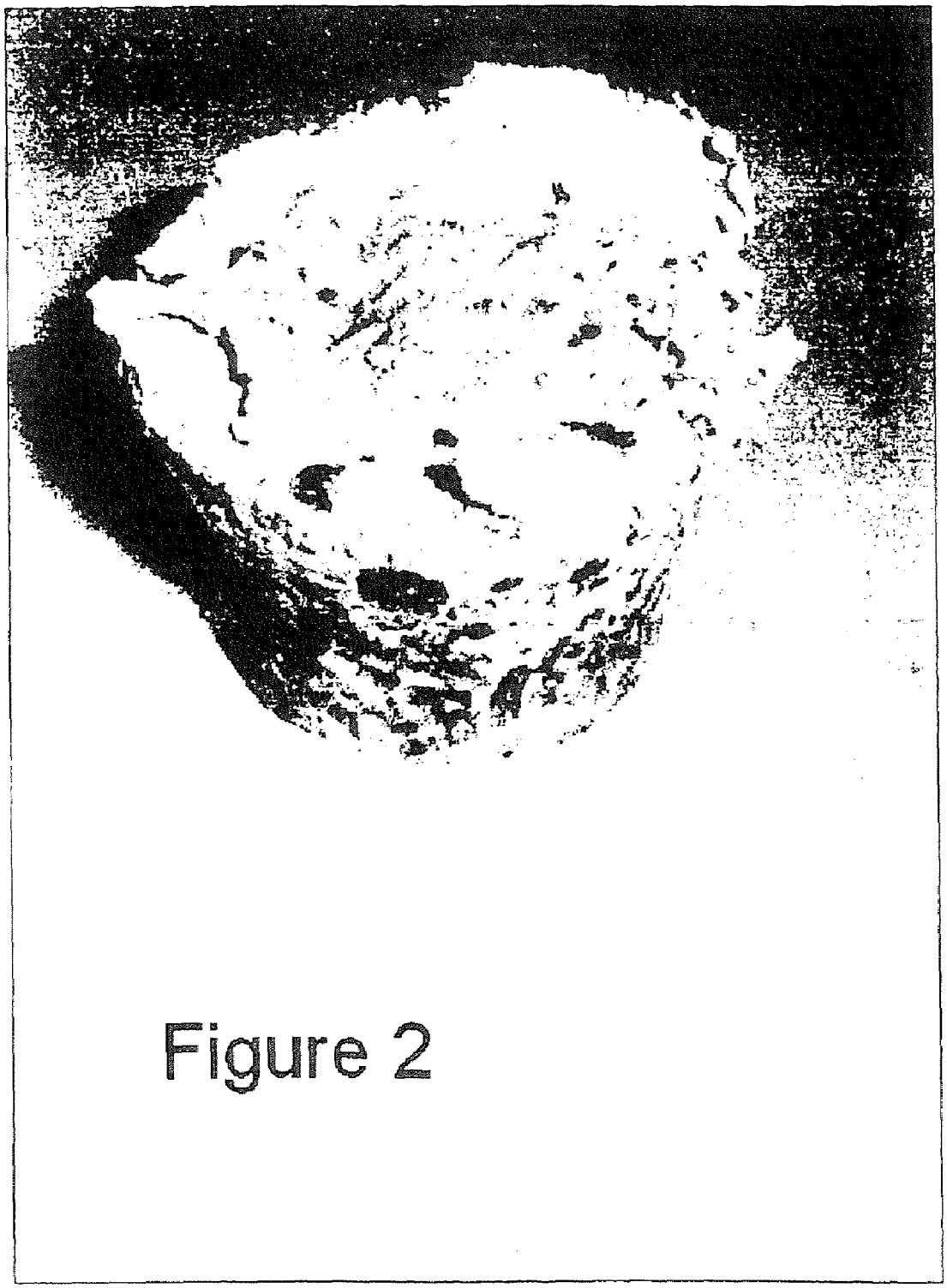
FIG. 2 is a photograph of a sample swellable material mixture.

One test of swellable elastomeric material was made in a container to demonstrate its swellable properties. The swelled test sample is illustrated in FIG. 2. This test sample was made from a mixture of Latex 2000 additive (210 g), Stabilizer 434B additive (13 g), D-Air-3 antifoaming additive (0.83 g), MicroBond HT cement additive (10 g), sulphur (4.22 g), ZnO (4.12 g), cement (Secar 71) (25 g), and bentonite (150 g). The materials were mixed and then placed in a container, which is then cured in a high-temperature chamber (180 F). After the development of the material, it was soaked in water for 3-5 days. The material expanded about 50-70%.

In one example, the elastomeric particles comprise particles of water-swellable elastomer. The elastomeric particles are initially placed in the fracture using a slurry formed from an non-aqueous fluid, and the particles are expanded later during contact with water.

In another example, the elastomeric particles comprise particles of hydrocarbon-swellable elastomer. The elastomeric particles are initially placed in the fracture using a slurry formed from an aqueous fluid and are expanded upon contact with hydrocarbons. For example, the swellable material swells when contacted with hydrocarbon gas.

In a further example, the elastomeric particles include particulates coated with swellable materials.

In a yet further example, swellable elastomer materials that do not immediately swell, for example taking several hours before a significant expansion occurs, can also be used to make particles which are placed in the fracture with carrier fluids causing swelling. The delay in expansion means that the materials can, if desired, be pumped down a wellbore without resorting to coatings or the use of a particular carrier fluid. The delay in expansion can be achieved by relying on osmosis in the elastomer to cause liquid contact with the swellable materials added to or mixed with the elastomer.

In another example, the particles placed in the fracture include particles of water-swellable elastomeric material having water-swellable materials (such as bentonite) embedded in the particle. The particles are placed in the fracture and allowed to at least partially swell before the fracture is closed.

Examples of elastomer that are swellable in hydrocarbons are disclosed in U.S. Patent Application Publication Number 2004/0020662 to Fryer published Feb. 5, 2004. Any of these swellable materials can be used to form particulates or coating for non-elastic particulates.

Forming a fracture and depositing swellable fluid-blocking material therein can be accomplished using conventional fracturing techniques or hydrajetting as described in U.S. Pat. No. 5,765,642, which is incorporated herein by reference. By using hydrajetting, fractures can be formed in a selected location with a selected orientation, shape and size. The methods basically comprise positioning a hydrajetting tool having at least one fluid jet-forming nozzle in the wellbore at the location to be fractured and jetting fluid through the nozzle into the material surrounding the wellbore at a pressure sufficient to form a fracture.

In hydrajetting, a relatively small fracture referred to in the art as "microfracture" is created utilizing a hydrajetting tool having at least one fluid jet-forming nozzle. The tool is positioned adjacent to a location to be fractured, and fluid is then jetted through the nozzle at a pressure sufficient to form a cavity and fracture the material surrounding the wellbore by stagnation pressure in the cavity. A high stagnation pressure is produced at the tip of a cavity because of the jetted fluids being trapped in the cavity as a result of having to flow out of the cavity in a direction generally opposite to the direction of the incoming jetted fluid. The high pressure exerted on the formation at the tip of the cavity causes a microfracture to be formed and extended a short distance into the formation.

In order to extend a microfracture further into the formation, a fluid is pumped from the surface into the wellbore to raise the ambient fluid pressure while the fluid jet or jets are operated. The fluid in the wellbore flows into the cavity produced by the fluid jet and flows into the fracture at a rate and high pressure sufficient to extend the fracture an additional distance from the wellbore.

The fracture's shape, size and orientation can be determined by the orientation of the fluid nozzles and movement thereof. Using hydrajetting radially from a vertical wellbore, a transversely-(horizontally) extending fracture 20 can be formed and filled with swellable material as illustrated in FIG. 1 extending 50-1000 ft. from the wellbore. In other applications such as water flooding, vertically-(parallel) extending fractures can be formed to create a curtain wall fluid block. Indeed, fluid blocks formed in multiple adjacent wells could be used to form co-operating fluid blocks.

Therefore, the present inventions are well adapted to carry out the objects and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A fluid barrier in a subterranean hydrocarbon-bearing area penetrated by a wellbore, comprising:
a wellbore intersecting the area; and
a fluid barrier extending transversely into the area from the wellbore, the barrier containing particulate material comprising at least some particles made at least in part from elastomeric material impregnated, mixed, or coated with a material that swells when contacted with water.

2. The barrier of claim 1, wherein the elastomeric material comprises styrene butadiene rubber.

3. The barrier of claim 1 wherein the material that swells when contacted with water is selected from the group consisting of a water swellable clay, a polyacrylate, or any combination thereof.

4. The barrier of claim 1 wherein said barrier comprises a fracture extending from the wellbore and the fracture containing the elastomeric material.

5. The barrier of claim 1 wherein said barrier comprises a fracture formed by hydrojetting with the fracture extending from the wellbore and the fracture containing the elastomeric material.

6. The barrier of claim 1 additionally comprising a plug closing off flow through the wellbore.

7. The barrier of claim 6 wherein the plug is located adjacent to the barrier.

8. The barrier of claim 6 wherein the plug closing off flow through the wellbore comprises a bridge plug.

9. The barrier of claim 6 wherein the plug closing off flow through the well-bore comprises cementious material.

10. A fluid barrier in a fracture or void in a subterranean formation penetrated by a wellbore comprising at least some particles made at least in part from elastomeric material impregnated, mixed, or coated with a material that swells when contacted with water.

11. The barrier of claim 10 wherein the elastomeric material comprises styrene butadiene rubber.

12. The barrier of claim 10 wherein the material that swells when contacted with water is selected from the group consisting of a water swellable clay, a polyacrylate, or a combination thereof.

13. The barrier of claim 10 additionally comprising a plug closing off flow through the wellbore.

14. The barrier of claim 13 wherein the plug is located adjacent to the barrier.

15. The barrier of claim 14 wherein the plug closing off flow through the wellbore comprises a bridge plug.

16. The barrier of claim 14 wherein the plug closing off flow through the wellbore comprises cementious material.

* * * * *